United States Patent
Tiana

(10) Patent No.: US 11,360,552 B1
(45) Date of Patent: Jun. 14, 2022

(54) HIGH ASSURANCE HEADTRACKING VIA STRUCTURED LIGHT PROJECTION FOR HEAD WORN DISPLAY (HWD)

(71) Applicant: Rockwell Collins, Inc., Cedar Rapids, IA (US)

(72) Inventor: Carlo L. Tiana, Portland, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 149 days.

(21) Appl. No.: 16/890,919

(22) Filed: Jun. 2, 2020

(51) Int. Cl.
| | | |
|---|---|---|
| *G06F 3/01* | (2006.01) | |
| *G02B 27/00* | (2006.01) | |
| *G06T 7/73* | (2017.01) | |
| *G06V 20/64* | (2022.01) | |
| *G06V 40/16* | (2022.01) | |

(52) U.S. Cl.
CPC ......... *G06F 3/012* (2013.01); *G02B 27/0093* (2013.01); *G06T 7/75* (2017.01); *G06V 20/64* (2022.01); *G06V 40/166* (2022.01); *G06T 2207/30204* (2013.01)

(58) Field of Classification Search
CPC . G06F 3/012; G06T 2207/30204; G06T 7/70; G06T 2200/04; G06T 7/20; G06T 7/73; G06T 7/75; G02B 2027/0187; G02B 27/0093; G06K 9/2054; G06K 9/00201; G06K 9/00255
See application file for complete search history.

(56) References Cited

U.S. PATENT DOCUMENTS

| | | | |
|---|---|---|---|
| 5,645,077 A | 7/1997 | Foxlin | |
| 5,812,257 A | 9/1998 | Teitel et al. | |
| 6,049,747 A * | 4/2000 | Nakajima | B60N 2/002 340/576 |
| 6,162,191 A | 12/2000 | Foxlin | |
| 6,176,837 B1 | 1/2001 | Foxlin | |
| 6,311,129 B1 | 10/2001 | Lin | |
| 6,361,507 B1 | 3/2002 | Foxlin | |
| 6,377,401 B1 | 4/2002 | Bartlett | |

(Continued)

OTHER PUBLICATIONS

Head Pose Estimation and Augmented Reality Tracking: An Integrated System and Evaluation for Monitoring Driver Awareness (Year: 2010).*

(Continued)

*Primary Examiner* — Nizar N Sivji
(74) *Attorney, Agent, or Firm* — Suiter Swantz pc llo

(57) ABSTRACT

A structured light assurance system for a head tracking system is disclosed. In embodiments, the structured lighting system includes structured light projectors mountable in an aircraft cockpit or other mobile platform, the projectors oriented toward a pilot or operator of the mobile platform for capturing three-dimensional (3D) imagery of the pilot (e.g., via offset imaging sensors) and determining from the captured 3D imagery a position and orientation (pose) of the pilot's head relative to the mobile platform and independent of the main headtracking system. The structured lighting system verifies the determined head pose (and may also self-calibrate) by identifying within the captured imagery static fiducial markers fixed to the cockpit in known locations. The structured lighting system forwards the determined head pose to the main headtracker for drift correction or initial head pose updating by the latter system.

9 Claims, 3 Drawing Sheets

(56) References Cited

U.S. PATENT DOCUMENTS

| | | |
|---|---|---|
| 6,408,245 B1 | 6/2002 | An et al. |
| 6,409,687 B1 | 6/2002 | Foxlin |
| 6,449,559 B2 | 9/2002 | Lin |
| 6,474,159 B1 | 11/2002 | Foxlin et al. |
| 6,480,152 B2 | 11/2002 | Lin et al. |
| 6,658,354 B2 | 12/2003 | Lin |
| 6,681,629 B2 | 1/2004 | Foxlin et al. |
| 6,738,714 B2 | 5/2004 | McCall et al. |
| 6,786,877 B2 | 9/2004 | Foxlin |
| 6,820,025 B2 | 11/2004 | Bachmann et al. |
| 7,000,469 B2 | 2/2006 | Foxlin et al. |
| 7,046,215 B1 | 5/2006 | Bartlett |
| 7,266,446 B1 | 9/2007 | Pelosi |
| 7,301,648 B2 | 11/2007 | Foxlin |
| 7,395,181 B2 | 7/2008 | Foxlin |
| 7,409,290 B2 | 8/2008 | Lin |
| 7,640,106 B1 | 12/2009 | Stokar et al. |
| 7,672,781 B2 | 3/2010 | Churchill et al. |
| 8,019,538 B2 | 9/2011 | Soehren et al. |
| 8,165,844 B2 | 4/2012 | Luinge et al. |
| 8,953,154 B2 | 2/2015 | Galea et al. |
| 8,965,736 B2 | 2/2015 | Horton et al. |
| 9,766,075 B2 | 9/2017 | Foxlin |
| 9,891,705 B1* | 2/2018 | Lahr .................... G06K 9/2054 |
| 10,068,049 B2 | 9/2018 | Gibbs et al. |
| 10,216,265 B1 | 2/2019 | Kirchner et al. |
| 10,775,881 B1* | 9/2020 | Lahr .................... G06T 7/70 |
| 2008/0218434 A1* | 9/2008 | Kelly .................... G02B 27/01 345/8 |
| 2010/0109976 A1* | 5/2010 | Gilbert .................. G02B 27/017 345/8 |
| 2019/0041979 A1* | 2/2019 | Kirchner .................. G06T 7/70 |

OTHER PUBLICATIONS

Incremental Learning for Robust Visual Tracking (Year: 2008).*
JanusVF: Accurate Navigation Using SCAAT and Virtual Fiducials (Year: 2009).*
Indoor localisation through object detection within multiple environments utilising a single wearable camera (Year: 2017).*
A Thesis Submitted to the Graduate School of Department of Computer Engineering of Middle East Technical University (Year: 2010).*
A 3D Topological Tracking System for Augmented Reality (Year: 2010).*
The Multimodal Driver Monitoring Database: A Naturalistic Corpus to Study Driver Attention (Year: 2021).*
Costi, Stephen Matthew et al., "Mobile Motion Capture", Worchester Polytechnic Institute Digital WPI, Dec. 2014m https://digitalcommons.wpi.edu/mqp-all, 94 pages.
Foxlin, Eric et al., "FlightTracker: A Novel Optical/Inerital Tracker for Cockpit Enhanced Vision", Proceedings of the Third IEEE and ACM International Symposium on Mixed and Augmented Reality, Nov. 2, 2004, 10 pages.

* cited by examiner

HIGH ASSURANCE HEADTRACKING VIA STRUCTURED LIGHT PROJECTION FOR HEAD WORN DISPLAY (HWD)

TECHNICAL FIELD

The subject matter disclosed herein is directed generally to headtracking systems for aircraft pilots, and more particularly to alternative or backup systems for correcting drifting systems.

BACKGROUND

Headtracking devices allow helmet-mounted or otherwise head-worn enhanced display systems to provide pilots and crew of fightercraft or other aircraft with accurate enhanced vision (e.g., synthetic vision, augmented reality, mixed reality) by monitoring the position and orientation ("pose") of the pilot's head relative to the aircraft with high accuracy, such that conformal information displayed to the pilot at any moment aligns precisely with what the pilot would otherwise be seeing when looking in that direction at that moment. However, most headtracking systems incorporate inertial measurement units (IMU) prone to inherent drift which must be periodically corrected or otherwise accounted for; drift correction (and/or the associated tools) may be complex or cumbersome.

SUMMARY

An assurance system for a head tracking system (e.g., for a helmet-mounted or head-worn display) is disclosed. In embodiments, the assurance system includes structured light sensors (e.g., projectors, illuminators) mounted in an aircraft cockpit (or other mobile platform) and oriented toward a pilot or other occupant. The structured light sensors project patterns onto the occupant and capture three-dimensional (3D) imagery (e.g., from paired offset imaging sensors) which is analyzed to determine a head pose (e.g., a current position and orientation of the head) relative to the mobile platform reference frame. The assurance system may self-calibrate or verify the head pose by identifying within the captured 3D imagery static fiducial markers mounted within the cockpit at known fixed locations relative to the mobile platform. The determined head pose may be forwarded to the main headtracking system as a reassurance or correction to the initial head pose determined by the main headtracker, e.g., to correct or cancel out inherent drift in the main headtracking system.

In some embodiments of the assurance system, the static fiducial markers are three-dimensional (3D) markers whose known location includes an orientation relative to the mobile platform.

In some embodiments of the assurance system, the determined head pose may be based on the identified positions of secondary fiducial markers attached to the occupant or operator.

In some embodiments of the assurance system, the secondary fiducial markers are 3D fiducial markers whose identified position includes an orientation relative to the mobile platform.

In some embodiments of the assurance system, the projected pattern includes high density portions corresponding to a likely location of the head (e.g., head volume, head box).

In some embodiments of the assurance system, the mobile platform is an aircraft with a cockpit, the structured light sensor is fixed within the cockpit, and the projected patterns contour or conform to the interior surfaces of the cockpit.

In some embodiments of the assurance system, the structured light sensors are mounted behind the pilot.

In some embodiments of the assurance system, the head tracking system is configured to determine an initial head pose relative to the mobile platform reference frame and update the initial head pose based on the independent head pose determined by the structured lighting system.

In some embodiments of the assurance system, the structured lighting system includes memory for storing head models; the structured lighting system compares captured 3D imagery to the head models to refine the head pose determination.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
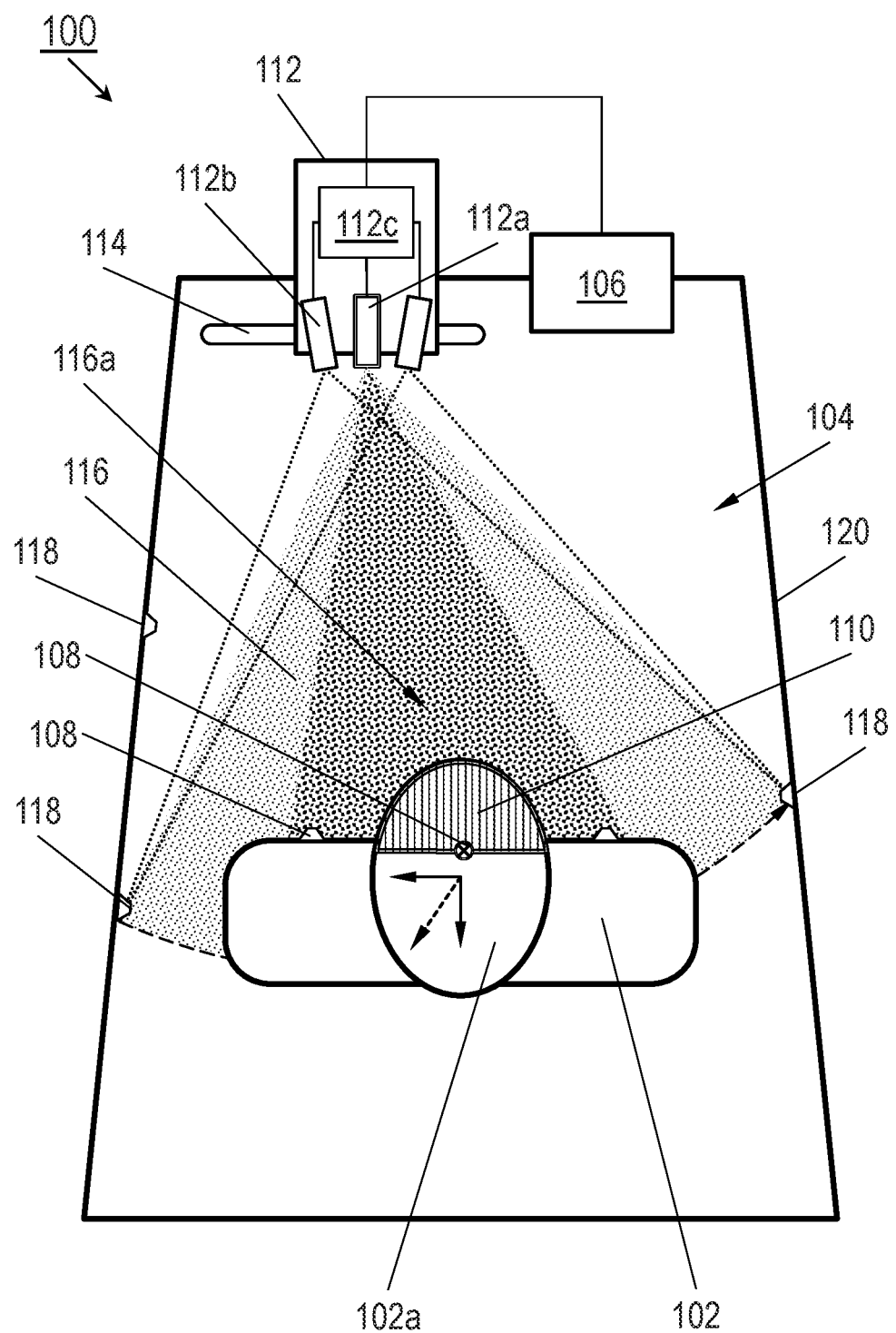
FIG. 1 is a diagrammatic illustration of a structured light assurance system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a mobile platform 100 is disclosed. The mobile platform 100 may be an aircraft or other vehicle (e.g., water-based, ground-based, hybrid) controlled by a pilot 102 (e.g., crewmember, operator, occupant) stationed in a cockpit 104 or other like control center.

In embodiments, the mobile platform 100 may incorporate a headtracking system to monitor the position and orientation (e.g., pose, head pose) of the pilot 102 (or, more particularly, the head 102a of the pilot) relative to the mobile platform. For example, the headtracking system may use a camera 106 (e.g., an optical or magnetic tracking devices) fixed to the interior of the cockpit 104 to capture imagery from within the cockpit, featuring the pilot 102 and secondary (e.g., non-static) fiducial markers 108 (e.g., reflective, optical, magnetic) attached to the pilot (e.g., to the pilot's helmet or flightsuit), such that a pose of the pilot's head 102a may be determined by or derived from the positions or orientations of the fiducial markers at any moment. The determined pose may be forwarded to a helmet-mounted or head-worn display 110 (HWD) for updating of conformal information displayed to the pilot (e.g., aircraft, natural or manmade features, and terrain proximate to, above, or beneath the mobile platform 100) based on a current and accurate head pose.

In embodiments, the mobile platform 100 may incorporate a structured lighting system 112 (including, e.g., structured lighting projectors (112a), imaging sensors (112b), and/or control processors (112c)). For example, the structured lighting system 112 may serve as an assurance or backup system to the main headtracking system 106, providing ground truth independent of the main headtracking system to periodically correct any cumulative drift therein. The structured lighting system 112 may be mounted in the cockpit 104 so as not to interfere with the main headtracking system 106 (e.g., although the structured lighting system and main headtracking system may share one or more components; for example, the main headtracking system may serve as a known reference for the structured lighting system, assisting the identification of head or facial features which may differ from pilot to pilot). In some embodiments, the structured lighting system 112 may be mounted to a glareshield 114 facing the pilot 102, or in other noncontested locations within the cockpit 104 where a fixed and known orientation toward the pilot may be maintained.

In embodiments, the structured lighting projectors 112a (e.g., illuminators) are aligned toward the pilot 102, projecting or illuminating distinct patterns (116) onto the pilot and the pilot's head 102a and capturing three-dimensional (3D) imagery of the projected patterns via the offset imaging sensors 112b. For example, by determining a delta between the imagery captured by each offset imaging sensor 112b, the control processors 112c may determine a head position (e.g., based on volume occupancy) and a head orientation (e.g., based on the placement and orientation of individual facial or helmet features, e.g., nose or eye orientation, facial axes) relative to the mobile platform 100 (e.g., as the structured lighting system 112 may be mounted in a fixed orientation within the cockpit 104 and thus fixed to the reference frame of the mobile platform).

In embodiments, the projected patterns 116 may be contoured to the interior surfaces of the cockpit 104 from the perspective of the structured lighting projectors 112a. Further, the projected patterns 116 may include high density zones 116a corresponding to the head box volume within the cockpit 104, e.g., the volume within which the head 102a is most likely to be found. For example, the high-density zones 116a may allow for greater detail and resolution for those portions of the captured 3D imagery including the head 102a, leading to more confident and detailed identification of head and facial features and more accurate determination of head position and orientation.

In some embodiments, the structured lighting system 112 may store to internal memory head models, e.g., previously curated or prior captured 3D imagery indicative of known positions and/or orientations of heads, faces, and facial features. For example, the control processors 112c may compare captured 3D imagery to head models in memory in order to more accurately determine the location and orientation of the pilot's head 102a and/or individual features thereof. In some embodiments, the captured 3D imagery may include, and the determined head pose may be in part based upon, the position and orientation of secondary fiducial markers 108 fixed to the pilot 102 and/or head 102a (e.g., and thus fixed to the reference frame of the pilot/head). For example, the secondary fiducial markers 108 may include three-dimensional fiducial markers capable of presenting a different profile to the offset imaging sensors 112b depending upon their orientation (and thus indicative of the orientation of the pilot 102 and/or head 102a relative to the mobile platform 100).

In some embodiments, static fiducial markers 118 may be mounted to interior surfaces (e.g., side walls 120) of the cockpit 104 in fixed, known locations proximate to where the pilot 102 and/or the head 102a may be detected by the structured lighting sensors 112a. For example, the static fiducial markers 118 may be three-dimensional markers with fixed known orientations relative to the mobile platform. By detecting the static fiducial markers 118, whose positions and orientations relative to the cockpit 104 (and therefore relative to the structured lighting system 112) remain a constant ground truth independent of any variation or movement on the part of the pilot 102, the structured lighting system 112 may self-calibrate and self-align (e.g., self-boresight). Further, the fixed positions and orientations of the static fiducial markers 118 may be used by the structured lighting system 112 to verify the determined head pose prior to forwarding to the main headtracking system, or to self-calibrate the system periodically or at startup.

Figure 2:
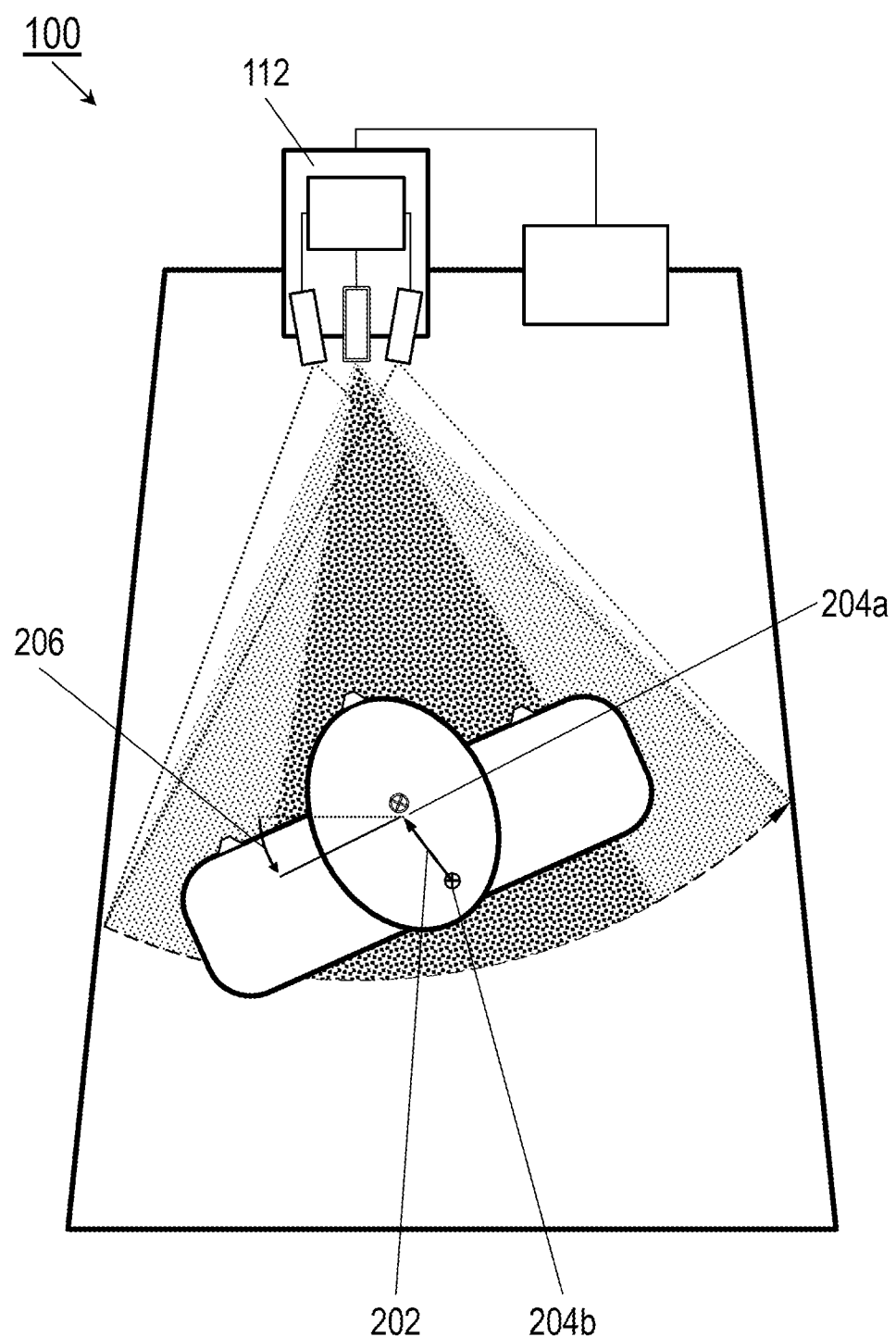
FIG. 2 is a diagrammatic illustration of the structured light assurance system of FIG. 1.

Referring now to FIG. 2, the mobile platform 100 is disclosed.

In embodiments, the pilot 102 may change position (202) relative to the mobile platform 100; the change of position may reflect a delta between the position 204a of the pilot at time $T_2$ relative to the prior position 204b of the pilot at immediately prior time $T_1$ (as shown by FIG. 1). Similarly, the pilot 102 may change orientation (206), e.g., rotate relative to the mobile platform 100 (and relative to one or more rotational axes, e.g., a pitch or x-axis, a roll or y-axis, a yaw or z-axis). The changes in position and orientation (202, 204) may be detected by the main headtracking system 106 but may be contaminated by inherent drift on the part of the main headtracking system. The structured lighting system 112 may similarly detect the changes in position and orientation (202, 204) and may determine and verify an updated head pose of the head 102a independent of the main headtracking system 106, forwarding the updated and verified head pose to the main headtracking system. The main headtracking system 106 may in turn correct its own determined head pose before updating the HWD 110.

Figure 3:
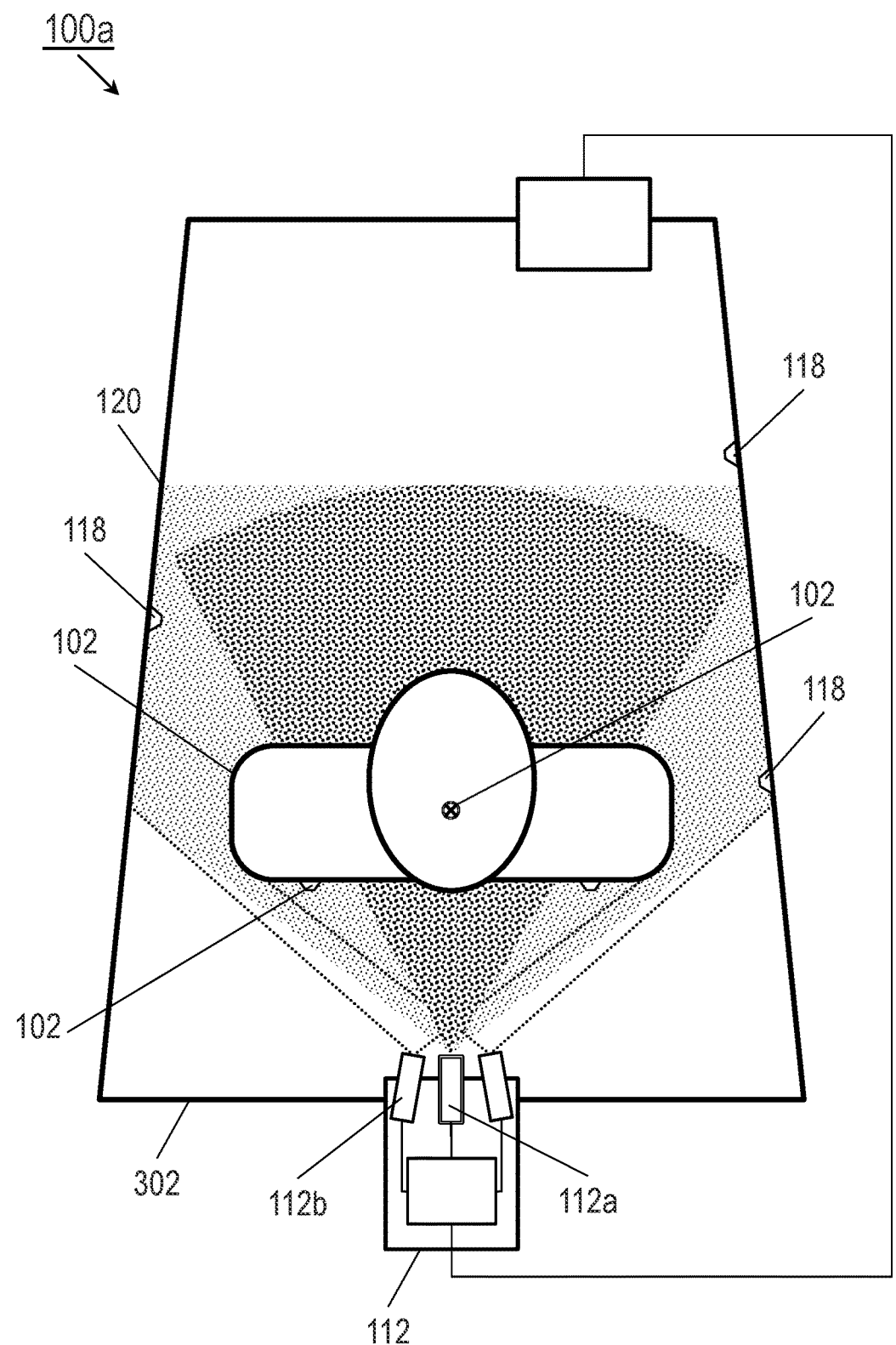
FIG. 3 is a diagrammatic illustration of the structured light assurance system of FIG. 1.

Referring now to FIG. 3, the mobile platform 100a may be implemented and may function similarly to the mobile platform 100 of FIGS. 1 and 2, except that the structured lighting system 112 may be mounted on a side wall 120 or on a surface 302 behind the pilot 102 and oriented toward the pilot. Similarly, the fiducial markers 108 may be positioned and/or oriented on the pilot 102 at the rear, oriented toward the structured lighting sensors 112a and offset imagers 112b.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. An assurance system for a head tracking system, comprising:
at least one structured light sensor mountable in a mobile platform in a fixed orientation toward an occupant of the mobile platform, the structured light sensor configured to:
project at least one structured light pattern onto the occupant;
and
capture three-dimensional (3D) imagery associated with 1) the at least one projected pattern, 2) a head of the occupant, and 3) a plurality of static fiducial markers fixed to the mobile platform, each static fiducial marker corresponding to a known marker location relative to the mobile platform;
and
one or more control processors in communication with the at least one structured light sensors, the one or more control processors configured to:
based on the captured 3D imagery, determine a head pose of the occupant, the head pose comprising:
a position of the head relative to the mobile platform;
and
an orientation of the head relative to the mobile platform;
verify the determined head pose based on one or more of the known marker locations;
and
forward the verified head pose to a head tracking system configured to track the head of the occupant; wherein the captured 3D imagery is associated with one or more secondary fiducial markers associated with the head tracking system; and the determined head pose is based on at least one secondary marker location associated with the one or more secondary fiducial markers.

2. The assurance system of claim 1, wherein:
the plurality of static fiducial markers are 3D fiducial markers;
and
the known marker location includes a known orientation of the static fiducial marker relative to the mobile platform.

3. The assurance system of claim 1, wherein the one or more secondary fiducial markers are attached to the occupant.

4. The assurance system of claim 1, wherein:
the one or more secondary fiducial markers are three-dimensional (3D) fiducial markers;
and
the at least one secondary marker location includes an orientation of the secondary fiducial marker relative to the mobile platform.

5. The assurance system of claim 1, wherein:
the at least one projected pattern includes at least one high density portion corresponding to a likely location of the head.

6. The assurance system of claim 1, wherein:
the mobile platform is an aircraft having a cockpit;
the occupant is a pilot of the aircraft seated within the cockpit;
the at least one structured light sensor is fixed within the cockpit;
and
the at least one projected pattern corresponds to at least one interior surface of the cockpit.

7. The assurance system of claim 6, wherein the at least one structured light sensor is mounted behind the pilot.

8. The assurance system of claim 1, wherein:
the head tracking system is configured to:
determine an initial head pose comprising:
an initial position of the head relative to the mobile platform;
and
an initial orientation of the head relative to the mobile platform;

receive the determined head pose from the at least one structured light sensor, and update the initial head pose based on the received verified head pose.

9. The assurance system of claim 1, further comprising:

at least one memory communicatively coupled to the one or more control processors, the at least one memory configured to store one or more head models;

wherein the control processors are configured to determine one or more of the position and the orientation by comparing the captured 3D imagery to the one or more head models.

* * * * *